(12) United States Patent
Bowe et al.

(10) Patent No.: US 7,234,489 B2
(45) Date of Patent: *Jun. 26, 2007

(54) VALVE WITH VORTEX CHAMBER AND A MECHANICAL MEMBER TO SHUT OFF FLOW

(75) Inventors: Michael Joseph Bowe, Preston (GB); John William Stairmand, Chester (GB)

(73) Assignee: Accentus PLC, London (GB)

( * ) Notice: Subject to any disclaimer, the term of this patent is extended or adjusted under 35 U.S.C. 154(b) by 422 days.

This patent is subject to a terminal disclaimer.

(21) Appl. No.: 10/474,733

(22) PCT Filed: Apr. 2, 2002

(86) PCT No.: PCT/GB02/01574

§ 371 (c)(1),
(2), (4) Date: Oct. 14, 2003

(87) PCT Pub. No.: WO02/084154

PCT Pub. Date: Oct. 24, 2002

(65) Prior Publication Data

US 2004/0216785 A1    Nov. 4, 2004

(30) Foreign Application Priority Data

Apr. 12, 2001 (GB) ................................ 0109223.8
Jan. 18, 2002 (GB) ................................ 0201081.7

(51) Int. Cl.
*F15C 1/16* (2006.01)

(52) U.S. Cl. ..................................................... 137/813

(58) Field of Classification Search ................ 137/810, 137/812, 813
See application file for complete search history.

(56) References Cited

U.S. PATENT DOCUMENTS

| 1,588,645 | A |   | 6/1926  | Barrett  |           |
|-----------|---|---|---------|----------|-----------|
| 3,712,321 | A |   | 1/1973  | Bauer    | 137/81.5  |
| 4,632,107 | A | * | 12/1986 | Butler   | 128/204.24|
| 5,365,962 | A | * | 11/1994 | Taylor   | 137/14    |

(Continued)

FOREIGN PATENT DOCUMENTS

DE          3744424          7/1989

(Continued)

OTHER PUBLICATIONS

English language abstract of DE 3744424.

*Primary Examiner*—Eric Keasel
*Assistant Examiner*—Craig Schneider
(74) *Attorney, Agent, or Firm*—William H. Holt

(57) ABSTRACT

A valve assembly (10) comprises a vortex chamber (14) with an axial outlet port (20), a main inlet port (16) for a fluid to be controlled, and a substantially tangential inlet port (25); the fluid enters through an inlet chamber (13) in which is a mechanical valve (26) movable so as to obstruct fluid flow into the vortex chamber (14). A duct (24) links the inlet chamber (13) to the tangential inlet port (25) of the vortex chamber. The position of the mechanical valve (26) affects the flow of fluid through the duct (24), so the vortex chamber (14) amplifies the effect of the mechanical valve. Further movement of the valve (26) closes off flow altogether (40). The assembly may include a weir (36) in the outlet, to separate gas and liquid phases.

8 Claims, 4 Drawing Sheets

U.S. PATENT DOCUMENTS

| | | | |
|---|---|---|---|
| 7,011,101 B2 * | 3/2006 | Bowe et al. | 137/14 |
| 2005/0173009 A1 * | 8/2005 | Bowe et al. | 137/808 |
| 2006/0076065 A1 * | 4/2006 | Bowe | 137/625.33 |

FOREIGN PATENT DOCUMENTS

| | | |
|---|---|---|
| EP | 0530967 | 3/1993 |
| GB | 2209411 | 5/1989 |
| GB | 2259585 | 3/1993 |

* cited by examiner

VALVE WITH VORTEX CHAMBER AND A MECHANICAL MEMBER TO SHUT OFF FLOW

The present invention relates to a valve assembly that may be used to control a flow of a liquid or a gas, and that resists damage from erosion or cavitation, and to a use of it.

The use of a purely mechanical valve in which a valve member seals against a valve seat is very widely known, and can be used either to adjust the flow of a fluid or to close off the flow altogether. Such a valve is not entirely suitable for use in controlling flows of potentially abrasive fluids, for example the liquids or gases emerging from an oil well that may contain sand particles, as the particulate material will cause abrasion of the valve surfaces especially when the valve is almost closed. Fluid flows can also be controlled, as described in GB 2 259 585, by a control valve combined with a fluidic vortex valve, in which the main flow flows through the control valve to enter a vortex chamber with an axial outlet, and a secondary flow of liquid bypasses the control valve to enter the vortex chamber via a tangential inlet; the magnitude of the tangential flow has a very large effect on the main flow, as it generates a vortex in the chamber. Such a combined valve can be used as a choke valve, and has the benefit that it suffers much less from abrasion. However the fluidic vortex valve always has fluid emerging from it, since if the main flow is to be effectively shut off then the tangential flow must be at its maximum.

According to the present invention there is provided a valve assembly comprising a vortex chamber with an axial outlet port, a main inlet port for a fluid to be controlled, and a substantially tangential inlet port; an inlet chamber defining an inlet supply port and also communicating with the main inlet port of the vortex chamber; a mechanical valve member movable so as to obstruct fluid flow through the main inlet port of the vortex chamber; and a duct communicating at one end with the inlet chamber and at the other end with the substantially tangential inlet port of the vortex chamber, wherein the mechanical valve member is such that further movement thereof closes off flow through both the main inlet port and the tangential inlet port.

In a first embodiment, the vortex chamber provides the flow path for at least the larger part of the fluid entering the inlet supply port, whenever the valve assembly is open, that is to say whatever the flow rate through the valve assembly. When the valve assembly is fully open, substantially all the fluid entering the inlet supply port flows through the vortex chamber from the main inlet port to the axial outlet port, but the flow resistance of the vortex valve is low because the flow through the tangential inlet port is negligible.

The flow of liquid through the tangential inlet port of the vortex chamber is due only to the pressure difference between the inlet chamber and the vortex chamber, and so occurs to a significant extent only if the mechanical valve is partly closed. The vortex chamber hence amplifies the effect of the mechanical valve. For example if the mechanical valve creates a pressure drop of 10%, the effect on the main flow might be a reduction of 80%. By operating in this way the erosive and cavitational wear on the mechanical valve mechanism is significantly reduced. A wide range of flow modulation can be achieved with limited movement of the mechanical valve member.

The main inlet port for the vortex chamber is preferably an axial inlet, the vortex chamber also including a baffle to cause the flowing fluids to follow radial paths, but alternatively the main inlet port might be a radial inlet. There may be a plurality of substantially tangential inlet ports, each communicating via a duct with the inlet chamber.

In a preferred embodiment the mechanical valve member includes a valve stem movable within the inlet chamber. Preferably means are also provided for sealing the axial outlet port of the vortex chamber, so that the flow through the valve mechanism can be completely shut off, linked with the mechanical valve mechanism, most preferably the sealing means of the outlet port being integral with the valve stem of the mechanical valve member for obstructing the inlet port of the vortex chamber. Hence in normal usage, for modulating the flow, the stem moves in a narrow range; but when full shut-off is required the stem moves to a larger extent so that the sealing means seals against a valve seat at the outlet port.

As an alternative to sealing the axial outlet port, the mechanical valve member may be movable to seal the inlet port of the vortex chamber, and be linked with means to seal the ducts leading to the tangential ports. Preferably the sealing element for the inlet port is integral with the sealing means for the said ducts.

In passing through the valve assembly the fluid undergoes a significant pressure drop and emerges as a vortex. Where the fluid is a gas stream containing a vapour such as water vapour, the decrease in temperature associated with the pressure drop may be sufficient to cause condensation of vapour to form droplets. The tangential spinning of the gas flow as it leaves the vortex chamber may be sufficient to cause these droplets to impact with the wall of the outlet and hence to be separated from the gas flow. Thus another aspect of the invention is an apparatus for separating a condensible vapour from a gas stream through passage through such a valve assembly provided with a weir structure in an outlet duct from the vortex chamber. By adjusting the position of the mechanical valve mechanism, the temperature at the outlet from the vortex chamber may be controlled to a substantially constant value, so that the dewpoint of the emerging gas (after separation of the droplets) is substantially constant.

In a second embodiment, the vortex chamber provides the flow path for the bulk of the fluid entering the inlet supply port only when the valve assembly is almost closed, that is to say only at very low flow rates through the valve assembly. In contrast, when the valve assembly is fully open, substantially all the fluid entering the inlet supply port bypasses the vortex chamber. However, when the valve assembly is almost closed, the vortex chamber provides the flow path and also the bulk of the pressure drop across the valve assembly. This second embodiment can provide a wider range of acceptable flows through the valve assembly, and an improved resistance to erosion.

For example, the vortex chamber may be defined within a telescopic mechanical valve structure comprising an outlet tube comprising one or more flow ports, and a valve sleeve slidable over the outside of the outlet tube to obstruct the flow ports; the vortex chamber may be defined between the closed ends of the outlet tube and the valve sleeve.

The invention will now be further and more particularly described, by way of example only, and with reference to the accompanying drawings in which.

Figure 1:
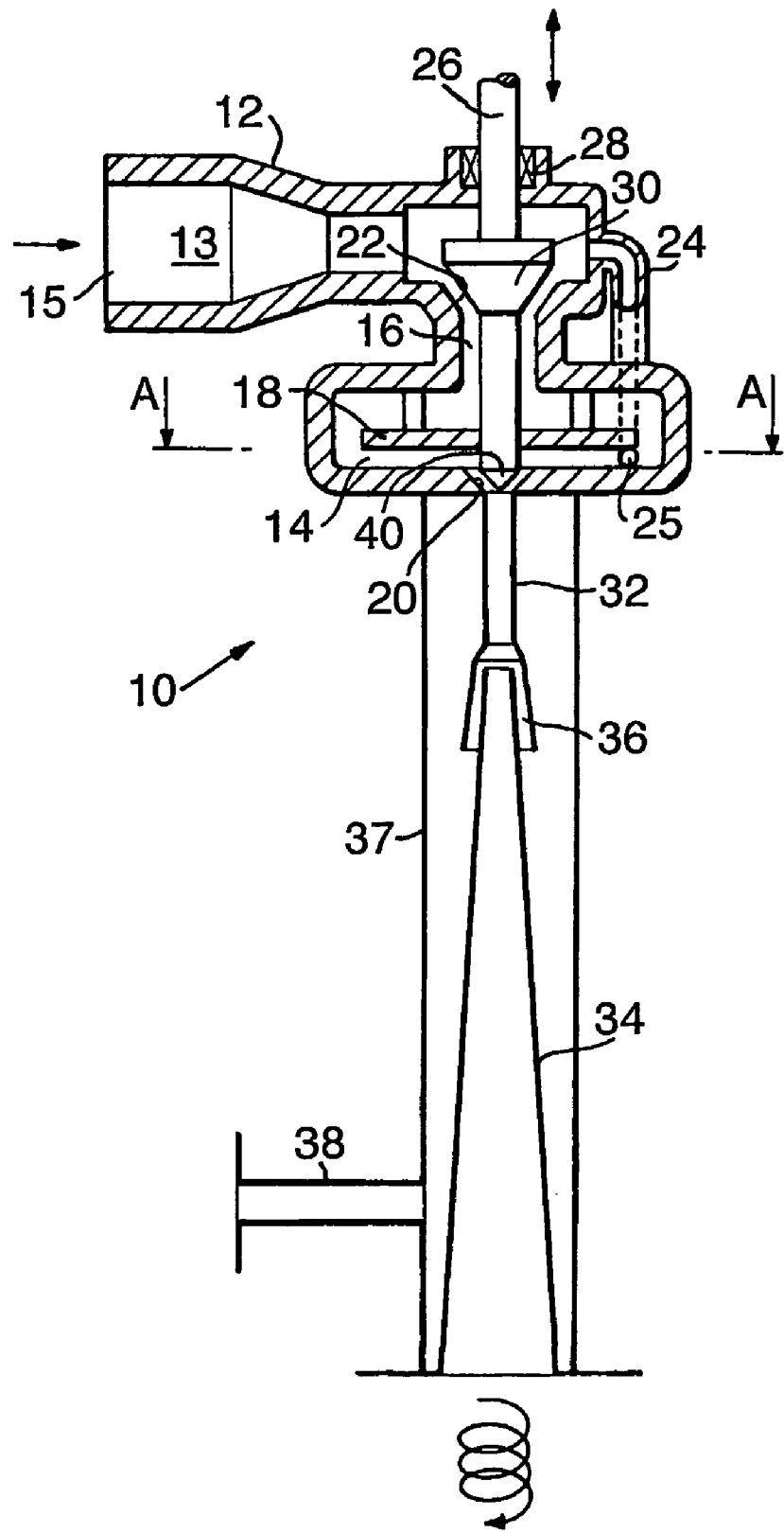
FIG. 1 shows a sectional view through a valve assembly.

Referring to FIG. 1, a valve assembly 10 comprises two chambers defined in a single housing 12: an inlet chamber 13 and a vortex chamber 14, the vortex chamber 14 being of substantially cylindrical shape. The fluid flow to be treated is supplied to an inlet supply port 15 of the inlet chamber 13. The inlet chamber 13 communicates via a port 16 with the vortex chamber 14, the flow through the port 16 entering the vortex chamber 14 in an axial direction, being deflected by a circular baffle plate 18 within the chamber 14, and emerging from an axial outlet port 20. The port 16 has a conically tapering section 22 facing the inlet chamber 13, followed by a cylindrical duct. The inlet chamber 13 also communicates with a narrow duct 24, which leads to a tangential inlet 25 into the vortex chamber 14. A conventional mechanical valve mechanism includes a valve stem 26 that is moved by an actuator (not shown) which may be hydraulic, the stem 26 passing through a seal 28 into the inlet chamber 13, and carrying an obstructing member 30 of truncated conical shape that mates with the tapering section 22 of the port 16. Movement of the valve stem 26 consequently controls the degree to which the port 16 is obstructed, and so controls the pressure drop of the fluid passing between the inlet chamber 13 and the vortex chamber 14.

The outlet port 20 tapers to communicate with a narrow bore cylindrical pipe 32, followed by a diffuser pipe 34 of gradually increasing bore. The end of the pipe 32 is stepped to be slightly larger than the external diameter of the adjacent end of the pipe 34, so as to define a circumferential slot 36 or weir through which liquid can emerge. A tube 37 surrounding the pipes 32 and 34 traps any fluids that emerge through the circumferential slot 36, and has an outlet duct 38 for the trapped fluids.

The valve assembly 10 may be used for dehumidifying a stream of gas of variable composition, such as a stream of natural gas from a well that has previously been passed through a phase separator to remove liquid droplets of water or oil, but which contains water vapour and possibly also condensible hydrocarbons. The position of the obstructing member 30 of the valve mechanism is adjusted so as to produce a desired pressure drop between the inlet chamber 13 and the outlet port 20, and hence a reduction in temperature at the outlet port 20. The pressure drop arising from the partial obstruction of the port 16 is amplified because it causes fluid to flow through the duct 24 to the tangential inlet 25 of the vortex chamber 14, and so causes vortex flow below the baffle plate 18 in the vortex chamber 14. The temperature at the outlet port 20 may be held at a substantially constant value, for example at 2° C., independent of changes in the temperature and composition of the gas stream, by measuring this temperature and using this information to control the movement of the valve stem 26.

Water vapour and condensible hydrocarbons consequently condense to form liquid droplets in the spinning gas stream passing through the pipe 32, these droplets being separated centrifugally from the gas flow and collecting on the wall of the pipe 32 to emerge through the slot 36. The gas emerging from the diffuser pipe 34 is hence of substantially constant dewpoint.

In addition the baffle plate 18 defines a central aperture. The valve stem 26 not only carries the obstructing member 30 that mates with the tapering section 22 of the port 16, but also extends through the port 16 and through the central aperture in the baffle plate 18, and has a conical tip 40 that mates with the axial outlet port 20. In normal use the valve stem 26 moves through only a small range, the consequential small changes in pressure drop through the port 16 being amplified by the consequential changes in the flow through the tangential inlet 25 of the vortex chamber 14, as described above. For example a 10% reduction in the pressure drop through the port 16 can produce a much greater reduction in the overall flow through the assembly 10, which may be as much as 80%. This method of operation significantly reduces the wear to the obstructing member 30 due to erosion and cavitation, as compared to a conventional valve. Where it is desired to completely shut off the fluid flow, the valve stem 26 moves through its full range so that the tip 40 seals the outlet port 20; the valve stem 26 is of such a length that in this position the obstructing member 30 is close to, but not in contact with, the tapering section 22 of the port 16.

The valve assembly may 10 be used to control fluids emerging from a well, for example where the emerging fluid comprises natural gas and droplets of water and oil. Where necessary, the flow of the fluid can be cut off. In normal operation the valve assembly 10 might be operated so as to maintain a gas temperature of 5–10° C. at the outlet port 20, so ensuring that ice does not form; the swirling gas flow in the pipe 32 ensures that the droplets of liquid (water and oil) impact with the wall of the pipe 32 and emerge through the slot 36, so that the droplets are no longer entrained with the gas. The slot 36 does not provide a complete separation of liquid and gas phases; better separation can be achieved by feeding the predominantly gas flow emerging from the diffuser 34 into the top of a large collection/separation vessel (not shown), and feeding the predominantly liquid flow into the base of that vessel, the vessel having a gas outlet at its top and a liquid outlet near its base, and controlling the flow rate through the valve assembly 10 to maintain the liquid/gas interface in the vessel at an intermediate position.

Figure 2:
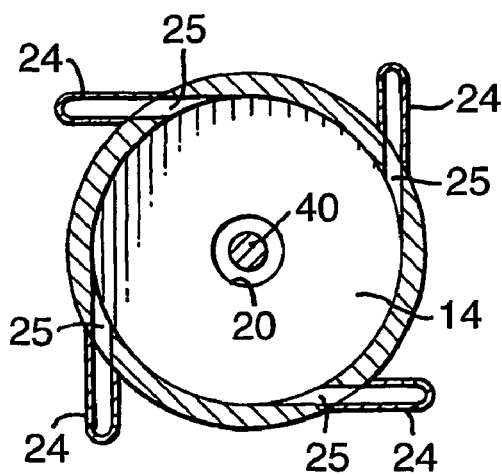
FIG. 2 shows a sectional view corresponding to that on the line A—A of FIG. 1, of a modification to the valve assembly of FIG. 1.

In the valve assembly 10, the inlet chamber 13 communicates via a narrow duct 24 to a tangential inlet 25 in the vortex chamber 14. In a modification there may be more than one such duct 24, each communicating with a respective tangential inlet 25 in the vortex chamber 14. For example, as shown in FIG. 2, there might be four such tangential inlets 25 equally spaced around the circumference of the vortex chamber 14.

It will be appreciated that a valve assembly of the invention may be used in different applications and for different purposes to those described above. For example, a stripping gas such as methane may be used to remove hydrocarbons from produced water from oil wells, for example using a fluidic vortex contactor; the vapours of organic materials (such as benzene or toluene) can then be separated from the methane by passing the methane through a valve assembly 10, so that the organic materials together with water vapour condense to form a liquid phase which is separated centrifugally from the methane. The methane can then be recirculated as the stripping gas. At the outlet 20 from the vortex chamber 14 the flow velocity can be very high (supersonic under some circumstances), and the temperature and pressure can consequently be very low. The low pressure may for example be employed to remove dissolved gases from a liquid, for example to strip dissolved oxygen from water, using an inert gas such as nitrogen.

Figure 3:
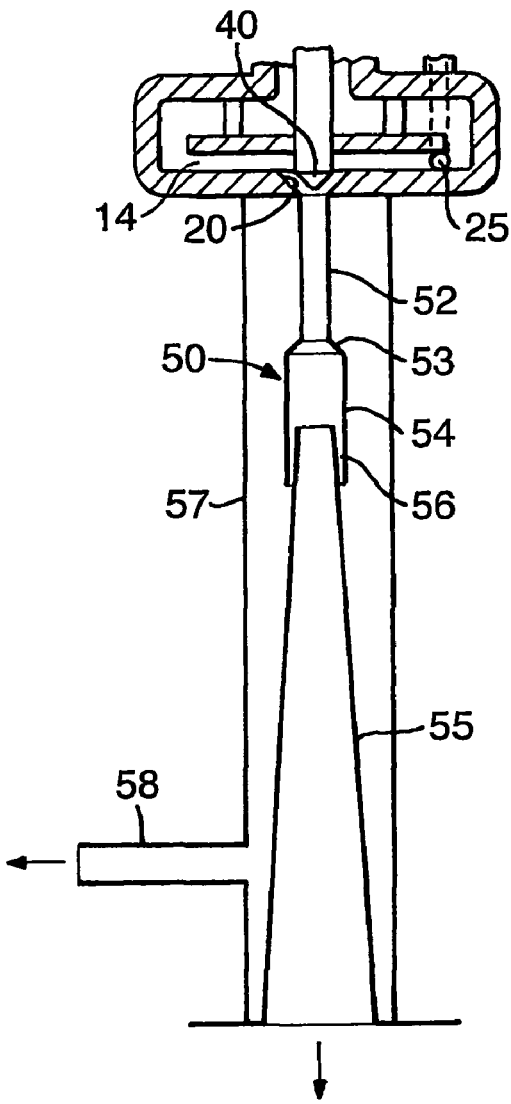
FIG. 3 shows a longitudinal sectional view of a modification to the outlet duct of the valve assembly of FIG. 1.

If the dimensions of the valve assembly and the flow rates are such that the flow velocity at the outlet 20 from the vortex chamber 14 is supersonic, and the emerging fluid flow contains droplets of liquid (for example due to condensation, as described above), it may be desirable to modify the pipe communicating with the outlet port 20. Referring now to FIG. 3, an outlet pipe 50 suitable for this purpose is shown in section, connected to the outlet port 20 of a vortex chamber 14. The outlet port 20 tapers to communicate with a narrow bore cylindrical pipe 52 within which the fluid flow is supersonic; at the lower end of this cylindrical pipe the bore is stepped outwardly (at step 53) into a larger-bore section of cylindrical pipe 54. There is a fluid shock at this abrupt change of bore 53, and the axial gas flow drops so it is no longer supersonic. The circumferential component of the swirling flow is unaffected, so the droplets are centrifugally separated from the gas flow more effectively. The upper end of a pressure recovery diffuser pipe 55 locates within the lower end of the pipe 54, so as to define a circumferential slot 56 or weir through which liquid can emerge. A tube 57 surrounding the pipes 50 and 55 traps any fluids that emerge through the circumferential slot 56, and has an outlet duct 58 for the trapped fluids.

Figure 4:
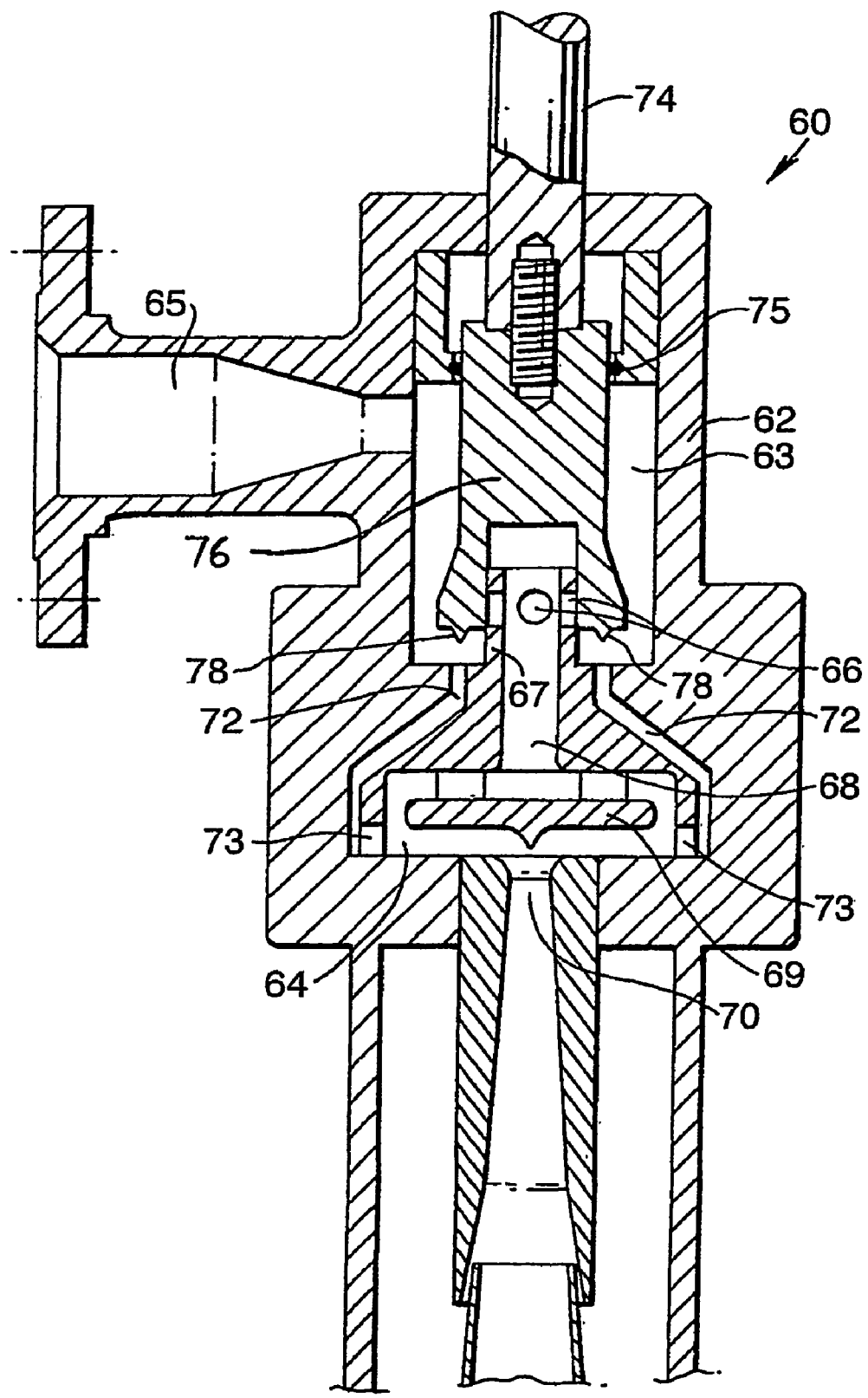
FIG. 4 shows a longitudinal sectional view of an alternative valve assembly.

In the valve assembly 10 the mechanical valve is an obstructing member 30 that mates with a tapering part 22 of a port 16. Alternatively the mechanical valve may be a sleeve valve, as shown in the valve assembly 60 shown in FIG. 4, to which reference is now made. The valve assembly 60 comprises two chambers defined in a housing 62: an inlet chamber 63 and a vortex chamber 64, the vortex chamber 64 being of substantially cylindrical shape. The fluid flow to be treated is supplied to an inlet supply port 65 of the inlet chamber 63. The inlet chamber 63 communicates via radial ports 66 of a tubular stub 67 with an inlet 68 to the vortex chamber 64, the flow through the inlet 68 entering the vortex chamber 64 in an axial direction, being deflected by a circular baffle plate 69 within the chamber 64, and emerging from an axial outlet port 70. The tubular stub 67 projects from the base (as a shown) of the inlet chamber 63. From the base of the inlet chamber 63 there are also two narrow ducts 72, which lead to tangential inlets 73 into the vortex chamber 64. A conventional mechanical valve mechanism includes a valve stem 74 that is moved by an actuator (not shown), the stem 74 passing through a seal 75 into the inlet chamber 63, and carrying at its end a sleeve member 76 that slides over the stub 67. The lower end of the sleeve member 76 defines two conical projections 78 that align with the ducts 72.

Thus in use, movement of the valve stem 74 controls the degree to which the ports 66 are obstructed, and so controls the pressure drop of the fluid passing between the inlet chamber 63 and the vortex chamber 64. In the position as shown in the figure, the sleeve member 76 just closes all the radial ports 66, so that the only flow is that through the narrow ducts 72 (which, by virtue of the vortex in the vortex chamber 64, impose a larger pressure drop than would radial ducts of the same dimensions). The flow can then be further reduced, and indeed stopped altogether, by further movement of the sleeve member 76 so that the projections 78 seal the openings of the ducts 72.

The valve assembly 60 may be modified in various ways, for example there might be a different number of narrow ducts 72 leading to tangential inlets 73; and the projections 78 that obstruct the ducts 72 might have a different shape.

Figure 5:
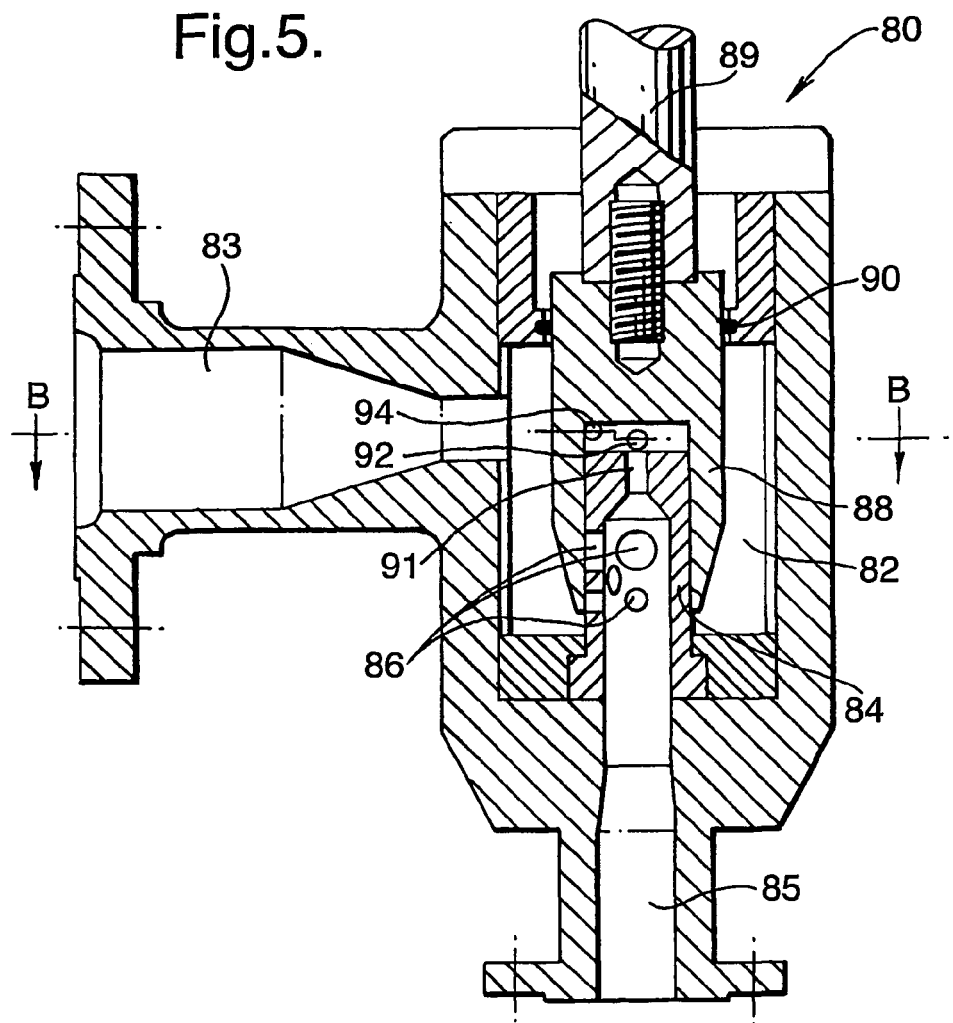
FIG. 5 shows a longitudinal sectional view of another alternative valve assembly.

Referring now to FIG. 5 there is shown a sectional view of an alternative valve assembly 80. The valve assembly 80 comprises a valve chamber 82 of substantially cylindrical shape and which communicates on one side with an inlet supply port 83 for a fluid flow to be treated. A valve tube 84 projects from one end wall of the valve chamber 82, and communicates with an outlet duct 85; the valve tube 84 defines a plurality of radial apertures 86 through its walls. A valve sleeve 88 closed at its top end (as shown) fits over the valve tube 84 and can be moved axially by an actuator (not shown) by means of a valve stem 89, passing through a seal 90 at the other end wall of the valve chamber 80. Movement of the valve stem 89 consequently controls the degree to which the apertures 86 are obstructed, and so controls the flow of the fluid passing between the inlet supply port 83 and the outlet duct 85. These features are substantially conventional.

Figure 6:
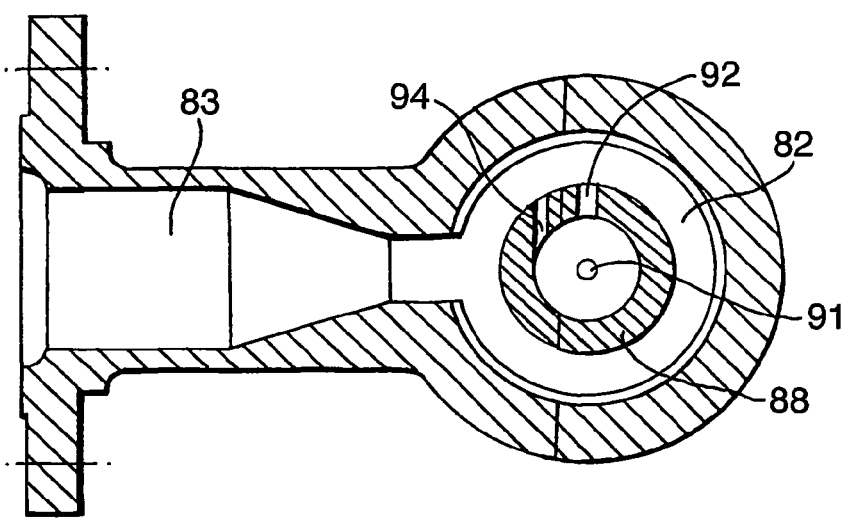
FIG. 6 shows a sectional view on the line B—B of FIG. 5.

The valve tube 84 is partly closed at its top end (as shown) but defines an axial port 91 communicating with the space between the top of the tube 84 and the top of the sleeve 88. The sleeve 88 defines a radial aperture 92 a short distance below the closed end, and also defines a tangential aperture 94 adjacent to the closed end. The radial aperture 92 is of larger diameter than the tangential aperture 94, and is located such that when the sleeve 88 is raised so that the tangential aperture is just fully open, a large portion of the radial aperture remains occluded by the sleeve 88. The orientations of the apertures 92 and 94 are shown more clearly in FIG. 6 but it is emphasized that the apertures 92 and 94 are not in the same radial plane. The cylindrical space defined between the top of the tube 84 and the closed end of the sleeve 88 thus defines a fluidic vortex valve.

When the valve assembly 80 is fully open, with the valve sleeve 88 exposing all the apertures 86, the fluid flow is maximum and the pressure drop is minimum. During operation, if the valve sleeve 88 is moved down it gradually obstructs flow through the apertures 86 and so decreases the fluid flow while increasing the pressure drop. In the position as shown, all the apertures 86 are closed, so fluid flow is primarily through the radial aperture 92 through the sleeve 88. Further movement of the sleeve 88 gradually closes the radial aperture 92 and consequently increases the proportion of the flow that passes through the tangential aperture 94, setting up more vigorous vortex flow in the vortex chamber and so increasing the pressure drop across the valve assembly 80. Further movement of the sleeve 88 completely closes the radial aperture 92, so that only tangential (and therefore vortex) flow occurs, therefore providing a significantly greater pressure drop than a plain orifice of equivalent hydraulic diameter. Finally, further movement of the sleeve 88 closes off the flow altogether.

In a further modification, there may be two such radial apertures 92, preferably directly opposite each other.

The invention claimed is:

1. A valve assembly comprising a vortex chamber with an axial outlet port, a main inlet port for a fluid to be controlled, and a substantially tangential inlet port; an inlet chamber defining an inlet supply port and also communicating with the main inlet port of the vortex chamber; a mechanical valve member movable so as to obstruct fluid flow through the main inlet port of the vortex chamber; and a duct communicating at one end with the inlet chamber and at the other end with the substantially tangential inlet port of the vortex chamber, characterised in that the mechanical valve member is such that further movement thereof prevents fluid flow through both the main inlet port and the tangential inlet port, completely shutting off flow through the valve assembly.

2. A valve assembly as claimed in claim 1 comprising means for sealing the axial outlet port of the vortex chamber, the sealing means of the outlet port being integral with a valve stem of the mechanical valve member for obstructing the inlet port of the vortex chamber.

3. A valve assembly as claimed in claim 1 wherein the mechanical valve member is moveable to seal the main inlet port of the vortex chamber, and is linked with means to seal the or each duct leading to the or each tangential inlet port.

4. A valve assembly as claimed in claim 1 also comprising a weir structure in the outlet from the vortex chamber to separate the fluid into two parts or phases.

5. A valve assembly as claimed in claim 1 wherein, when the valve assembly is fully open, at least the bulk of the fluid that enters the inlet supply port bypasses the vortex chamber.

6. A valve assembly as claimed in claim 5 comprising a tubular valve stub defining at least one radial flow aperture and an axial aperture, and a mating sleeve closed at one end and slidable over the stub so as to vary the extent to which the radial flow aperture is obstructed, and the sleeve defining a radial port and a tangential port into the space within the valve above the stub, so the vortex chamber is defined between the closed end of the sleeve and the end of the tubular valve stub.

7. A valve assembly as claimed in claim 6 wherein the radial port and the tangential port through the sleeve are in different radial planes.

8. A method of treating a gas so it has a substantially constant dewpoint, the method comprising passing the gas through a valve assembly as claimed in claim 4, and adjusting the position of the mechanical valve member so as to ensure the temperature at the outlet port is substantially constant.

* * * * *